United States Patent [19]

Rourke

[11] 4,264,293
[45] Apr. 28, 1981

[54] VENTED HEATED PLATEN

[75] Inventor: Rosemary Rourke, Newtown, Conn.

[73] Assignee: Norfield Corporation, Danbury, Conn.

[21] Appl. No.: 115,339

[22] Filed: Jan. 25, 1980

[51] Int. Cl.³ .............................................. B29C 5/00
[52] U.S. Cl. .................................... 425/407; 425/384; 425/445; 425/817 R; 249/79; 249/141
[58] Field of Search .............. 425/214, 233, 236, 406, 425/407, 408, 409, 411, 451.9, 495, 384, 810, 812, 394, 817, 577; 249/141, 79; 264/164

[56] References Cited

U.S. PATENT DOCUMENTS

| Re. 15,608 | 5/1923 | Burroughs | 425/810 X |
|---|---|---|---|
| 2,613,395 | 10/1952 | Massler | 425/810 X |
| 2,976,571 | 3/1961 | Moslo | 425/812 |
| 3,358,061 | 12/1967 | Gidge et al. | 425/812 |
| 3,577,843 | 5/1971 | Kutik et al. | 425/577 X |
| 3,765,810 | 10/1973 | Smarook | 425/394 X |
| 3,830,459 | 8/1974 | Strausfeld | 425/407 X |
| 3,854,852 | 12/1974 | Carter | 425/812 |
| 3,871,811 | 3/1975 | Barry et al. | 425/407 |
| 4,003,687 | 1/1977 | Hedin | 425/406 |
| 4,113,909 | 9/1978 | Beasley | 264/164 X |
| 4,201,742 | 5/1980 | Hendry | 425/812 |

FOREIGN PATENT DOCUMENTS 1256005 2/1961 France ..................................... 249/141

Primary Examiner—J. Howard Flint, Jr.
Attorney, Agent, or Firm—Kenyon & Kenyon

[57] ABSTRACT

A vented platen capable of being heated or cooled is disclosed wherein a plurality of heat exchange channels bored through the width of a plate member are arranged in a plane. The plate member has a plurality of openings on a surface that are vented by vent passages disposed on a plane substantially parallel to the plane of the heat exchange channels.

5 Claims, 5 Drawing Figures

VENTED HEATED PLATEN

BACKGROUND OF THE INVENTION

This invention relates to heated platens in general and more particularly to an improved heated platen less subject to leaks. Heated platens are used for various functions. Typically platens of this nature are made of aluminum and contain within them a plurality of parallel channels through which a heat exchange fluid may be passed in order to heat the platen. In large platens, the head exchange passages are divided up into zones so that all areas of the platen are equally heated, otherwise, the fluid by the time it went from end of the platen to the other would be considerably cooled and there would be uneven heating.

One type of heated platen that is of particular interest is a platen used in carrying out the expansion of a thermoformable material using a process such as that described in U.S. Pat. No. 3,765,810 and as also described in U.S. Pat. No. 4,113,909 granted to Donald R. Beasly and assigned to the Norfield Corporation, the same assignee as the present invention. In the process disclosed therein, a thermoformable plastic material is disposed between two platens, each of the platens having a surface containing a large number of vented openings. The platens are heated to a temperature of equal to or greater than 70° C. at which point the thermoformable material bonds by hot tack adhesion to the platens at areas other than those containing openings. The platens are moved apart and venting occurs at the openings. Thus, as the platens are pulled apart a cellular structure results as more fully disclosed in the aforementioned patents. The platens are then cooled whereupon the expanded material can be removed from between the platens.

The type of platens which have been used commercially for this purpose contain a plurality of circular holes all of which are vented, the holes being arranged in rows and columns which are staggered. The aforementioned U.S. Pat. No. 4,113,909 describes the manner in which such platens can be supported so as to maintain a planar surface. Although the method and apparatus described therein has been used in commercial applications to produce large panels of for example 4×8 feet, various problems have occured with platens.

At the vent areas, vent passages have been previously drilled through the platens in a direction perpendicular to the plane surface of the platen. Only small holes can be used so as to avoid running into the heat exchange channels which contain the heat exchange fluid. As a result, because of the nature of the plastic material being expanded, the holes tended to become clogged. A further problem with platens containing the vent passages in their top surface in that cracks have formed in the area between the heat exchange channel and the vent passages. Such cracks are not accessible, as are cracks which might occur in the bottom of the platen. Thus, the occurence of such cracks, may mean that the whole platen has to be scrapped and a new one made.

SUMMARY OF THE INVENTION

It is the object of the present invention to provide an improved platen of the type described above which avoids the problems of clogging.

This object is accomplished, in a platen of the type described above having vented openings in the form of circular holes in staggered rows, by boring a plurality of vent passages across the width of the panel in a plane parallel to the plane of the face of the platen. The vent passages are located so as to intersect the staggered rows of vented openings formed in the surface of the panel.

In a preferred embodiment the vent passages which are bored across the width of the platen are disposed so as to intersect two adjacent rows of holes thereby requiring a number of bores only half that of the number rows. Naturally, such vent passages could be bored over the length of the platen although because the length is usually greater than the width the process is more difficult.

DETAILED DESCRIPTION OF THE INVENTION

Figure 1:
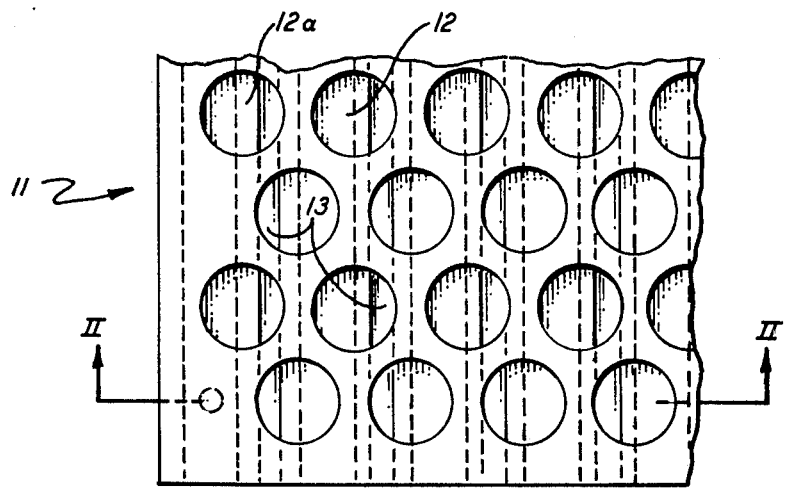
FIG. 1 is a plane view of a portion of a platen utilized for carrying out the expansion of thermoformable material.
Figure 2:
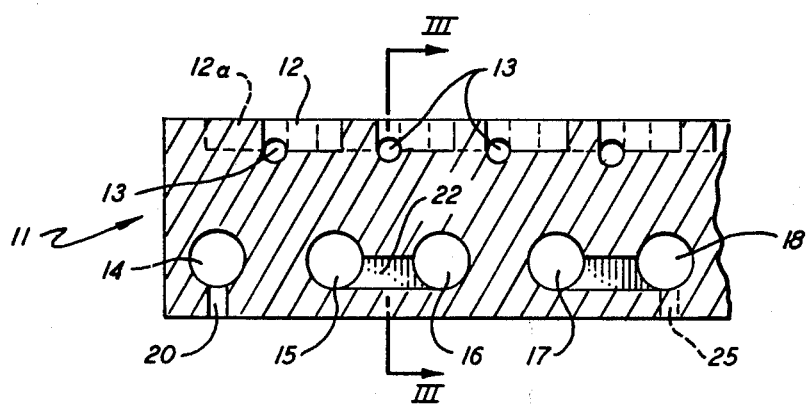
FIG. 2 is a longitudinal cross section through the platen of FIG. 1.

As illustrated by FIG. 1, a platen 11, typically one and three quarter inches which is provided for use in a process such as that described in the aforementioned patents for expanding thermo-formable material. In the plane view of FIG. 1 only a few of the vented openings 12 and 12a are shown. Typically in the platen used for making expanded panels of 5×10 feet or longer there would be 9,125 vented openings. These vented openings are arranged in rows and columns on staggered 1 inch centers, for example, each of the holes having a diameter of ¾ of an inch and being, 0.375 inches deep. Referring to the sectional view of FIG. 2 one of the vented openings 12 is visible as is a hole vented opening 12a in an adjacent column which is hidden in this view. At approximately the depth of the holes a plurality of vent passages 13 are bored across the width of the platen. Each vent passage 13 is located so as to intersect both the row of holes containing the holes 11 and row containing 11a thereby venting two sets of vented openings in a single vent passage.

A plurality of heat exchange channels 14, 15, 16, 17 and 18 are bored across the width of the platen 11, on a plane parallel to a plane defined by the vent passages 13 but disposed below and offset from the vent passages 13. The heat exchange channels 14 through 18 are used to contain a flow of heated or cooled fluid. Because of the parallel disposition of the vent passages 13 and the heat exchange channel 14, 15, 16, 17, and 18, the volume of venting provided by the vent passages 13 can be increased without interfering with the heat exchange channels. Also the arrangement wherein a vent passage 13 is put in communication with the plurality of vented openings 12 and 12a provides a savings in manufacturing costs and facilitates the cleaning of the vent passages 13. As noted, this method of venting has been found greatly superior to the prior art method in which an additional pilot hole was extended through the thickness plate. This method of venting in the platen of the present inventions is not as susceptible to clogging by errant particles. The method also allows for greater venting volume since the vent passages do not interfere with the fluid flow channel.

Figure 3:
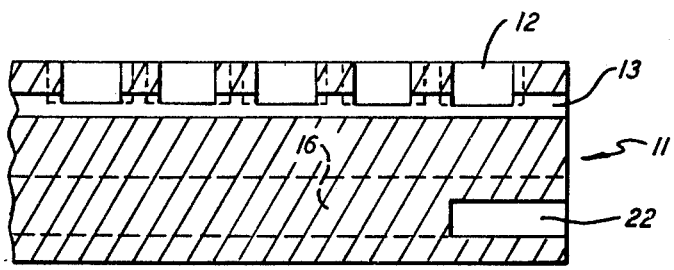
FIG. 3 is a transfer crosssection through the platen of FIG. 2.

Directly below the vented openings 12 and 12a are the heat exchange channels 14–18 which extend across the platen 11. As previously noted, each fluid flow zone includes five heat exchange channels. Heat exchange fluid is supplied from a manifold through a inflow pipe 20 to one end of the heat exchange channel 14. The heat exchange fluid flows through the channel 14 in a direction away from the observer. It then flows through a milled connecting channel 22 shown in cross section in FIG. 3 and into it heat exchange channel 15 in a direction towards the observer.

The venting of this invention has been used in the illustrated embodiment, wherein, rather than having the milled connecting channel 22 with a diameter equal to that of the heat exchange channel 14, the width of the milled connecting channel 15 smaller. Specifically in the illustrated embodiment, the milled connecting channel 22 has a width of only 7/16 inches and a depth of approximately 1 inch. In this manner the distance from the milled connecting channel 22 to the vent passage 13 is maintained at least as great as the distance from the vent passage 13 to the perphery of the heat exchange channel 14. If the milled connecting channel 22 was extended directly across and had the same width as the diameter of the heat exchange channels 14 and 15, then there would be a relatively small distance between its top surface and the vent passage 13 and then there would be a greater danger of cracks. Through this measure, the present invention thus provides a more reliable platen.

Fluid flows away from the observer in the heat exchange channel 14, through a milled connecting channel and back toward the observer again through a heat exchange channel 15, then through a milled connecting channel 22, etc. At the heat exchange channel 18, the fluid is removed to a manifold through an outflow conduit 25. The milled connecting channel of the illustrated embodiment is the subject of an application simultaneously filed with the present application and is not part of this invention.

Figure 4:
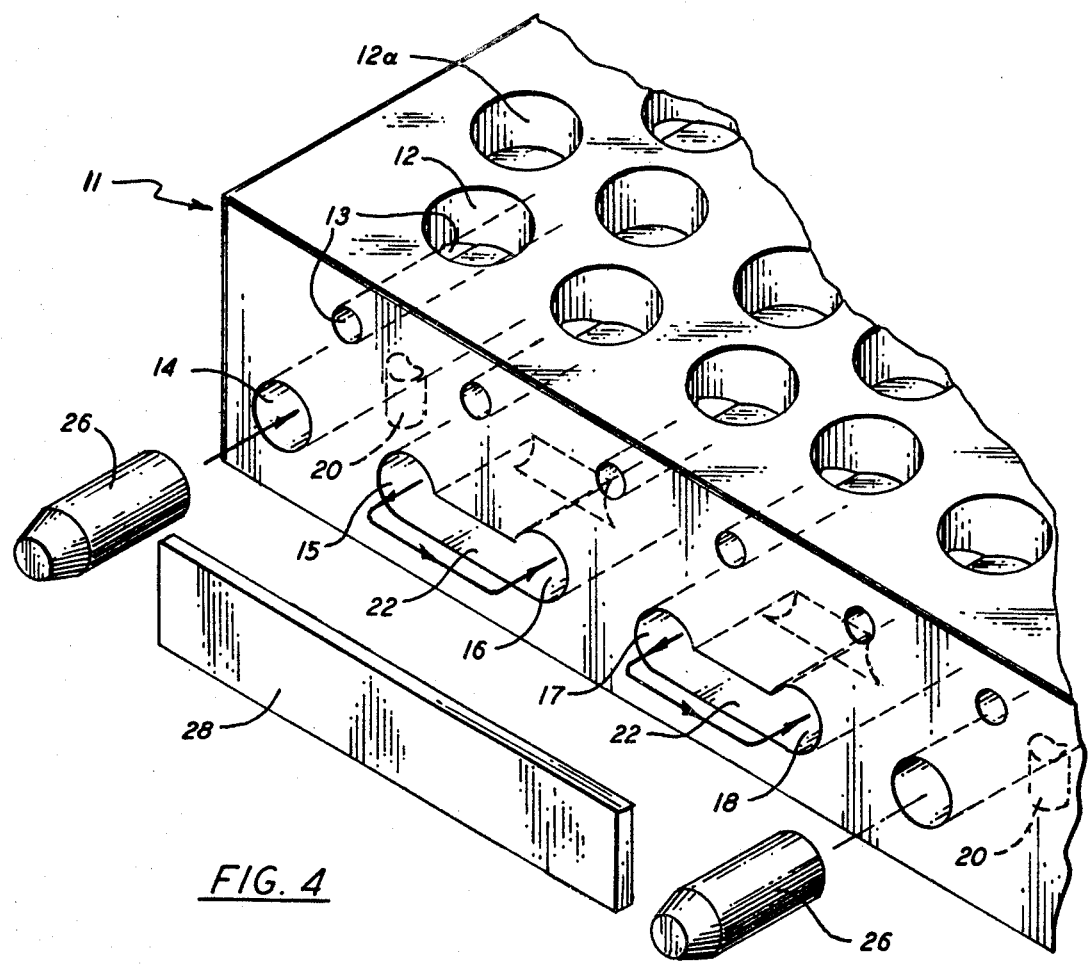
FIG. 4 is an end-view of the platen showing the placement of the end plates and plugs.
Figure 5:
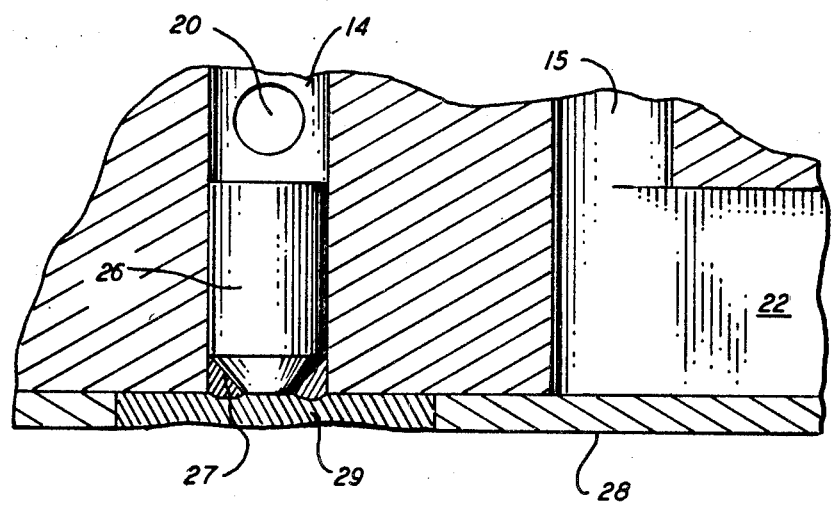
FIG. 5 is a mid cross section along the width of the platen showing the welds.

In the prior art the typical practice was to place a single end plate over each side of the platen covering the heat exchange channels 14, 15, 16, 17 and 18 along with the milled connecting channels 22 for each of the adjacent zones. With such an arrangement cracks tended to develop and seepage of fluid, for example from a channel 15 to channel 16 resulted. This is not desirable since the fluid in the channel 15 has given up its heat and is now relatively cool. The mixing of such fluid with the hot fluid in the channel 16 could substantially reduce its overall temperature and cause uneven heating of the platen. Furthermore, cracks developing at a plate welded over the heat exchange channels could result in loss of heat exhange fluid which is relatively expensive and the expense of shut down repair. The disadvantages of the prior art were overcome by the use of plugs 26 As illustrated by FIGS. 4 and 5, plug 26 is inserted in the end of the heat exchange channel 14 and in the end of the channel 18 at the other side of the platen. These plugs typically one inch in length and having a beveled outer surface are then welded to the platen with a weld 27. A small end plate 28 is then placed over the four remaining channels in the zone and welded in place. When this is done one will have, along each edge of the platen end plates 28 with welded plugs 26 in between. The final step is to form from a fillet weld 29 covering the welded plug 26 and joining the two adjacent end plates.

What is claimed is:

1. A platen for use in the expansion of thermoformable material comprising:
    a plate member having first and second face portions; a plurality of openings disposed on said first face portion of said plate member, said plate member having a plurality of heat exchange channels extending through the width of said plate member and a plurality of vent passages extending through said plate member disposed in a plane substantially parallel to and spaced from said first and second face portions of said plate, each of said plurality of vent passages placed in communication with at least one of said plurality of openings, thereby providing venting of the openings through the sides of the plate member.

2. A platen according to claim 1 wherein said openings are circular and have a center, and the openings are arranged in pairs of staggered rows with the centers of said openings in each of said pair of rows disposed along substantially parallel lines.

3. A platen according to claim 2 wherein said plate member is approximately 1¾ inches thick, and each of said openings have a diameter of ¾ of an inch, a depth of 0.375 inches and have centers 1 inch apart.

4. A platen according to claim 3 wherein said substantially parallel lines are at most one inch apart.

5. A platen according to claim 4 wherein said vent passages have a diameter of approximately ¼ of an inch.

* * * * *